United States Patent [19]

Sugio et al.

[11] 4,228,258

[45] Oct. 14, 1980

[54] RESIN COMPOSITION CONTAINING POLYPHENYLENE OXIDE

[75] Inventors: Akitoshi Sugio, Omiya; Masanobu Masu, Tokyo; Masaharu Kimura, Tokyo; Norio Sayama, Tokyo; Keiun Ko, Minoo; Eiichi Yonemitsu, Kashiwa, all of Japan

[73] Assignee: Mitsubishi Gas Chemical Company, Inc., Tokyo, Japan

[21] Appl. No.: 7,572

[22] Filed: Jan. 29, 1979

Related U.S. Application Data

[62] Division of Ser. No. 640,776, Dec. 15, 1975, Pat. No. 4,153,644.

[30] Foreign Application Priority Data

Dec. 26, 1974 [JP] Japan .................................. 49-148445
Dec. 26, 1974 [JP] Japan .................................. 49-148446

[51] Int. Cl.$^3$ ........................................... C08L 71/04
[52] U.S. Cl. ..................................... 525/390; 525/480
[58] Field of Search ............... 260/823; 525/231, 232, 525/247, 390,

[56] References Cited

U.S. PATENT DOCUMENTS

| | | | |
|---|---|---|---|
| 2,597,159 | 5/1952 | May et al. ........................... | 528/232 |
| 3,600,341 | 8/1971 | Schmidt et al. ...................... | 260/823 |

Primary Examiner—J. Ziegler
Attorney, Agent, or Firm—Armstrong, Nikaido, Marmelstein & Kubovcik

[57] ABSTRACT

A novel resin composition improved in moldability and impact resistance, comprising (A) a polyphenylene oxide having a molecular weight of 5,000 or higher, (B) an aromatic hydrocarbon-formaldehyde resin or a modified aromatic hydrocarbon-formaldehyde resin, and, if necessary, (C) a rubbery polymer, the weight ratio of the resin (A) to the resin (B) being from 10:90 to 99:1 and the amount of the rubbery polymer (C) being 3 to 40 parts by weight per 100 parts by weight of the sum of the resins (A) and (B). This resin composition has excellent mechanical and electrical properties of the polyphenylene oxide together with an improved moldability, impact resistance, and adhesiveness.

7 Claims, No Drawings

RESIN COMPOSITION CONTAINING POLYPHENYLENE OXIDE

This is a division of application Ser. No. 640,776, filed Dec. 15, 1975 which is now issued U.S. Pat. No. 4,153,644 issued May 8, 1979.

This invention relates to a resin composition useful for molding materials, surface-coatings, and adhesives. More particularly, it relates to a resin composition comprising (A) a polyphenylene oxide, (B) an aromatic hydrocarbon-formaldehyde resin or a modified resin thereof, and, if necessary, (C) a rubbery polymer, and having a markedly improved moldability, and adhesiveness without deterioration in excellent mechanical and electrical properties of the polyphenylene oxide.

Because of its distinguished mechanical and electrical performance characteristics and high deflection temperature, polyphenylene oxide has become an ojbect of keen interest as a practically useful engineering plastic material. However, since polyphenylene oxide has a high melting point, and, moreover, it degrades severely at high temperatures, the molding and processing of polyphenylene oxide by melt processing techniques encounters great difficulties. Consequently it will be of great significance for the development of use fields of polyphenylene oxide, if it is successful to lower as far as possible the molding and processing temperature and to improve the flowability, thus resulting in not only amelioration of moldability but also minimum thermal degradation during processing.

The present inventors proceeded with investigations of blended resin compositions comprising a polyphenylene oxide and other resins with the intention of improving the moldability of polyphenylene oxide while retaining its favorable intrinsic characteristics. As a result, they found that by admixing an aromatic hydrocarbon-formaldehyde resin or a modified product thereof (hereinafter these resin materials are referred to generically as aromatic hydrocarbon-formaldehyde resins) with polyphenylene oxide, it is possible to obtain a resin composition having a lowered melting point and a markedly improved moldability. It was further surprising that, in this case, the rigidity and mechanical strengths were also substantially improved while the electrical characteristics of polyphenylene oxide remained intact.

Further, a resin composition having excellent mechanical and electrical properties characteristic of the polyphenylene oxide was found to be formed by admixing the polyphenylene oxide with aromatic hydrocarbon-formaldehyde resins such as xylene resin and mesitylene resin which have been widely used in various fields such as adhesives.

It was also found that the said composition composed of two resins is superior in compatibility with or dispersibility in a rubbery polymer, to a known polyphenylene oxide composition containing the rubbery polymer, and when admixed with a rubbery polymer, the resulting composition is markedly improved in moldability and yields molded articles with improved physical properties and appearances, thus it was possible to obtain a resin composition having an improved moldability as well as improved impact resistance and electrical properties.

An object of this invention is to provide a resin composition containing a polyphenylene oxide, which has markedly improved moldability.

Another object of this invention is to provide a resin composition containing a polyphenylene oxide which has improved moldability as well as an improved impact resistance.

A further object of this invention is to provide a resin composition containing a polyphenylene oxide and having excellent mechanical and electrical characteristics of polyphenylene oxide together with improved moldability as well as improved impact resistance.

Other objects and advantages of this invention will become apparent from the following description.

According to this invention, there is provided a polyphenylene oxide-containing resin composition comprising (A) a polyphenylene oxide having a structural unit of the following formula and having a molecular weight of 5,000 or higher:

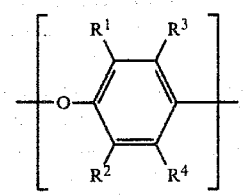

wherein $R^1$ is a substituent selected from the group consisting of hydrogen, lower alkyl, lower haloalkyl, lower alkoxy, and aryl groups, provided that when $R^1$ is a lower haloalkyl group, at least two carbon atoms are present between the halogen atom and the phenyl nucleus; each of $R^2$, $R^3$, and $R^4$ is a halogen atom, such as chlorine or bromine or has the same meanings as defined above for $R^1$; and the α-carbon atom is each of $R^1$, $R^2$, $R^3$, and $R^4$ is not tertiary; (B) an aromatic hydrocarbon-formaldehyde resin or a modified aromatic hydrocarbon-formaldehyde resin, and, if necessary, (C) a rubbery polymer, the amounts of said resins (A) and (B) being, respectively, 10 to 99% by weight and 1 to 90% by weight based on the total weight of both resins. In the present specification, all percentages and parts are by weight unless otherwise specified.

The polyphenylene oxide for use in the present composition is obtained by the polycondensation of at least one monomer represented by the following general formula in the presence of oxygen and a known catalyst:

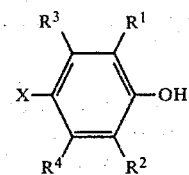

wherein $R^1$ is a substituent selected from the group consisting of hydrogen, lower alkyl, lower haloalkyl, lower alkoxy, and aryl groups, provided that when $R^1$ is a lower haloalkyl group, at least two carbon atoms are present between the halogen atom and the phenyl nucleus; each of $R^2$, $R^3$, and $R^4$ is a halogen atom or has the same meaning as defined above for $R^1$; the α-carbon atom in each of $R^1$, $R^2$, $R^3$ and $R^4$ is not tertiary; and X is a hydrogen atom or a halogen atom. Any known polyphenylene oxide obtained in this manner may be used. In the above general formula, the substituents $R^1$ and $R^2$ attached to carbon atoms on the phenyl nucleus at ortho positions to the phenolic hydroxyl group are generally lower alkyl groups, preferably straight chain alkyl groups having 1 to 4 carbon atoms, and $R^3$ and $R^4$ are preferably hydrogen atoms or lower alkyl groups having 1 to 4 carbon atoms.

The polyphenylene oxide for use has such a molecular weight that the polymer can be used in the manufacture of molded articles, paints, adhesives, and the like, that is, 5,000 or more, preferably 10,000 or more. When the present resin composition is intended to be used as a molding material, it is desirable to use a polyphenylene oxide having a molecular weight of 10,000 or more, in view of the physical properties of the resulting molded articles. It is an outstanding feature of this invention that the composition has a good moldability and molded articles having improved physical properties are obtained even when such a high-molecular-weight polyphenylene oxide is used.

The polyphenylene oxide used may be either a homopolymer consisting of single structural units or a copolymer consisting of two or more types of structural units. In the latter case, either a so-called random copolymer or a block copolymer may be used.

Typical examples of the polyphenylene oxide (A) for use in the present composition include poly(2,6-dimethyl-1,4-phenylene) oxide, poly(2-methyl-6-ethyl-1,4-phenylene) oxide, poly(2,6-diethyl-1,4-phenylene) oxide, poly(2-methyl-6-propyl-1,4-phenylene) oxide, poly(2,6-dimethoxy-1,4-phenylene) oxide, poly(2-chloro-6-methyl-1,4-phenylene) oxide, poly(2-methyl-6-methoxy-1,4-phenylene) oxide, poly(2,6-diphenyl-1,4-phenylene) oxide, poly(2-chloroethyl-6-methyl-1,4-phenylene) oxide, a copolymer of 2,6-dimethylphenol and 2,3,6-trimethylphenol, a copolymer of 2-methyl-6-ethylphenol and 2,6-dimethylphenol, a copolymer of 2,6-dimethylphenol and 2,6-diethylphenol and a copolymer of 2,6-diethylphenol and 2,3,6-trimethylphenol. These homopolymers and/or copolymers may be used alone or in admixture of two or more.

The aromatic hydrocarbon-formaldehyde resins (B) for use in the present composition include not only those in a narrow sense which are obtained by the reaction of alkylbenzenes with formaldehyde in the presence of an acid catalyst, but also modified resins obtained by modifying said aromatic hydrocarbon-formaldehyde resins with modifying agents reactive to the methylol group (—CH$_2$OH), methylene ether group (—CH$_2$OCH$_2$—), or acetal group [—CH$_2$(OCH$_2$)$_n$OCH$_2$—] contained in said resin.

When an alkylbenzene and formaldehyde are alloed to react in the presence of an acid catalyst such as a Lewis acid for example, SnCl$_2$, ZnCl$_2$, AlCl$_3$, PbCl$_2$, BF$_3$—Et$_2$O, or the like; an inorganic acid, e.g. sulfuric acid, hydrochloric acid, or phosphoric acid; or an organic acid, e.g. p-toluenesulfonic acid, m-xylenesulfonic acid or the like, there are formed normally viscous liquid to normally solid resins in which aromatic neuclei are connected to one another through methylene (—CH$_2$—), methylene ether (—CH$_2$OCH$_2$—) or acetal [—CH$_2$(OCH$_2$) OCH$_2$—] groups and which have the structure represented by the following formula,

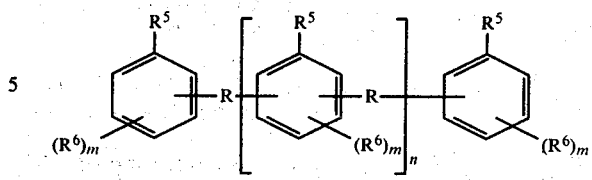

wherein n is generally a number of 10 or less, preferably 1 to 8; R is a methylene group, a methylene ether group, or an acetal group; $R^5$ is a methyl group; $R^6$ is a hydrogen atom or a metal group; and m is 0 or an integer of 1 or 2.

According to this invention, any of the aromatic hydrocarbon-formaldehyde resins thus formed may be used for blending with the polyphenylene oxide (A). Aromatic hydrocarbon-formaldehyde resins particularly suitable for the purpose of this invention have a molecular weight of 300 or higher, preferably 500 or higher. Any of the alkylbenzenes such as toluene, xylenes, or trimethylbenzenes may be used, but preferable are xylenes, particularly m-xylene mixed xylenes containing m-xylene as the major constituent, and trimethylbenzenes, particularly mesitylene.

When an alkylbenzene and formaldehyde are allowed to react in the presence of an acid catalyst, there is formed on the aromatic nucleus a functional group other than methylene group, such as methylol group, methylene ether group, or acetal group in the initial or final stage of the reaction. Therefore, a modified aromatic hydrocarbon-formaldehyde resin is formed by reacting a modifying agent reactive to the methylol group, methylene ether group, or acetal group with an aromatic hydrocarbon-formaldehyde resin in the presence of an acid catalyst. The modified aromatic hydrocarbon-formaldehyde resin thus formed is particularly suitable for the purpose of this invention.

Any modifying agents having the above-noted reactivity may be used. Examples of suitable modifiers are:

(a) Phenols such as phenol, resorcinol, bisphenol-A, m-cresol, and p-alkylphenols such as p-tert-butylphenol, p-octylphenol, p-nonylphenol;

(b) Carboxylic acids such as phthalic acid, isophthalic acid, terephthalic acid, trimellitic anhydride, pyromellitic acid, maleic anhydride, adipic acid, dimer acid, rosin, 3,6-endomethylene tetrahydrophthalic acid and tetrahydroterephthalic acid;

(c) Alcohols such as glycerol, 1,4-tetramethylene glycol, polyethylene glycol, polypropylene glycol, polytetramethylene glycol, xylylene glycol, neopentyl glycol and pentaerythritol.

Furthermore, amines and aromatic hydrocarbons may also be used such as aniline, xylylenediamine, acenaphthene and anthracene as the modifying agent.

Preferable are phenol, p-tert-butylphenol, p-octylphenol, p-nonylphenol, phthalic acid, isophthalic acid, terephthalic acid, trimellitic anhydride, pentaerythritol, polypropylene glycol and neopentyl glycol.

Although it is difficult to prescribe generally the amount of modifying agent used since it depends, to a considerable degree, on the type of modifying agent used, the suitable amount is usually up to 8 times the weight of aromatic hydrocarbon-formaldehyde resin, preferably 5 times or less, most preferably 0.2 to 2.5 times. It is desirable that the type of modifying agent and the quantity thereof to be introduced into the resin are selected so that a thermoplastic modified resin having an average molecular weight of 500 or more and a softening point of 60° to 200° C. may be formed as the final product.

The most suitable aromatic hydrocarbon-formaldehyde resin (B) for the object of this invention is a thermoplastic modified aromatic hydrocarbon-formaldehyde resin having an average molecular weight of 500 or higher, which is produced by reacting an alkylbenzene, particularly m-xylene or a mixed xylene containing m-xylene as the major constituent or mesitylene, with formaldehyde and modifying the resulting aromatic hydrocarbon-formaldehyde resin with at least one modifying agent selected from the group consisting of phenols, carboxylic acids, and alcohols.

In order for the present resin composition to have a moldability in combination with favorable physical properties, it is very important to blend 10 to 99% of the polyphenylene oxide (A) and 1 to 90% of the aromatic hydrocarbon-formaldehyde resin (B), both based on the total weight of (A) and (B). A polyphenylene oxide composition containing no aromatic hydrocarbon-formaldehyde resin (B) or a polyphenylene oxide composition containing less than the said lower limit amount of said resin (B) is, in general, difficult to mold or process owing to its low melt fluidity and, when molded or processed at higher temperatures, susceptible to thermal degradation; whereas a polyphenylene oxide composition containing the aromatic hydrocarbon-formaldehyde resin (B) in a quantity larger than the above-mentioned upper limit suffers from markedly reduced heat deflection temperatures and marked deterioration in electrical and mechanical characteristics. When the compounding weight ratio of the polyphenylene oxide (A) to the aromatic hydrocarbon-formaldehyde resin (B) is within the range from 99:1 to 10:90 according to this invention, a marked improvement in melt fluidity and other properties is imparted to the resulting resin composition without substantially losing the excellent electrical characteristics of the polyphenylene oxide, as shown in Examples which will appear hereinafter. It is surprising, moreover, that in the present resin composition, the decrease in heat deflection temperature due to admixing of the aromatic hydrocarbon-formaldehyde resin (B) is kept very small, while mechanical properties such as tensile strength are rather substantially improved by the incorporation of said resin (B). According to this invention, the compounding ratio of the polyphenylene oxide (A) to the aromatic hydrocarbon-formaldehyde resin (B) can be varied within the above-noted range in accordance with the molding means employed and the end of the molded articles; when the present resin composition is intended for use as molding material, it is especially desirable that said compounding weight ratio is selected from the range from 95:5 to 35:65, in view of the balance of performance characteristics.

The polyphenylene oxide (A) and the aromatic hydrocarbon-formaldehyde resin (B) can be compounded and processed in a manner known per se to obtain liquid products, powders, pellets, films, filaments, and sheets. For instance, both resins are dissolved in the common solvent and mixed to obtain a blend, or are mixed and extruded by means of an extruder to form pellets, film, or sheet, or are mixed by means of a roll mill or a Banbury mixer.

The rubbery polymer (C) used to improve the impact resistance according to this invention is a homopolymer of a conjugated diene compound or copolymer of a conjugated diene or an unconjugated diene compound with at least one member selected from the group consisting of olefins and vinyl compounds or a blended polymer of a homopolymer of a conjugated compound with a polymer of a vinyl or olefine compound. The rubbery polymer exhibits rubber elasticity at room temperature. Examples of such rubbery polymers are polybutadiene, polyisoprene, polychloroprene, ethylene-propylene-diene terpolymer, styrene-butadiene copolymer, arylonitrile-butadiene copolymer, butyl acrylate-acrylonitrile copolymer, styrene-grafted polybutadiene, styrene-butadiene block copolymer, styrene-butadiene-styrene block copolymer, methyl methacrylate-butadiene copolymer, and butyl methacrylate-butadiene copolymer. A polybutadiene-polystyrene-blend polymer (high-styrene rubber) containing 40 to 60% of polybutadiene is also suitable for the object of this invention.

The compounding weight ratio of the polyphenylene oxide (A), aromatic hydrocarbon-formaldehyde resin (B), and rubbery polymer (C) in the present resin composition varies considerably according to the type of each component and the end use of the resin composition, but generally 3 to 40, preferably 5 to 30, parts by weight of the rubbery polymer are used per 100 parts by weight in total of the polyphenylene oxide (A) and the aromatic hydrocarbon-formaldehyde resin (B), the weight ratio of (A) to (B) being the same as mentioned above.

In a resin composition consisting only of a polyphenylene oxide and a rubbery polymer, the rubbery polymer content cannot reach a level high enough for the improvement of impact resistance and the composition yields a shaped article generally inferior in appearances and physical properties. If the rubbery polymer content is below the above-noted range, the molded article is not sufficiently improved in impact strength, whereas if the rubbery polymer content exceeds the above-noted range, the dispersibility of the rubbery polymer tends to be insufficient and the molded article tends to be inferior in appearances such as surface smoothness and in mechanical properties such as tensile strength.

If the polyphenylene oxide content of the composition is below the above-noted range, there are lost the excellent electrical properties, high heat deflection temperature, and excellent mechanical strengths of the polyphenylene oxide. Therefore, in the present resin composition, the compounding weight ratio of the (A), (B) and (C) components is critical.

When the polyphenylene oxide (A), aromatic hydrocarbon resin (B), and rubbery polymer (C) are compounded in a proper ratio within the above-said range according to this invention, a resin composition having an excellent moldability results, which yields a molded article having markedly improved impact resistance and appearances as shown in Examples which appear hereinafter.

The compounding of the polyphenylene oxide (A), the aromatic hydrocarbon-formaldehyde resin (B), and the rubbery polymer (C) according to this invention can be carried out in any manner by use of a known means such as a mixing roll, a Banbury mixer, or an extruder. However, in order to obtain a resin composition having an excellent impact resistance, appearances as well as melt-moldability by homogeneously and finely dispersing the rubbery polymer in the resin composition, it is desirable to compound the components in the following manner: In the most preferable embodiment in the case of producing a resin composition containing the rubbery polymer (C), at first, the aromatic hydrocarbon-formaldehyde resin (B) and the rubbery polymer (C) are uniformly mixed to form a compounded resin composition (I) containing 25 to 75% of the rubbery polymer and then the resulting composition (I) is compounded with the polyphenylene oxide (A) or a mixture of the polyphenylene oxide (A) and the aromatic hydrocarbon-formaldehyde resin (B). The compounded resin composition (I) comprising the aromatic hydrocarbon-formaldehyde resin (B) and the rubbery polymer (C) may be in any form, such as in the form of a powder, pellet, strand, or a small cube. For instance, it can be mixed by means of a mixing roll, formed into sheeting, and cut to small cubes, or can be melt-mixed by means of an extruder, then extruded, and cut to pellets. The composition (I) has an excellent miscibility with the polyphenylene oxide (A) or a mixture of (A) and the aromatic hydrocarbon-formaldehyde resin (B), and can be compounded by simple melt-mixing by means of a Banbury mixer, mixing roll, or extruder, forming the present resin composition excellent in various properties as mentioned above. In this manner, it is possible to obtain the present resin composition in which any predetermined amount of the rubbery polymer is uniformly and finely dispersed in the polyphenylene oxide, without inconvenience of use of a particular organic solvent.

The present resin composition [either the binary composition of (A) and (B) or the ternary composition of (A), (B), and (C)] can be admixed, if necessary, in a manner known per se with one or more of the known additives such as antioxidants, thermal stabilizers, lubricants, releasing agents, crosslinking agents, blowing agents, colorants, various reinforcements in the form of fine powder or fiber, extenders, and flame retardants and other thermoplastic resins than the constituents of the present resin composition.

Since the present resin composition is excellent in melt fluidity, can be molded at a relatively low temperature, and is excellent also in impact strength and other mechanical strengths, it may be used in manufacturing various molded articles by, for example, extrusion molding, injection molding, or roll molding. It is also suitable for use in paints and adhesives.

The characteristic features of the present resin composition are illustrated below with reference to Examples, but the invention is not limited to the Examples.

In the Examples, the molecular weight is a number average molecular weight measured by means of a Vapor Pressure Osmometer.

EXAMPLE 1

In a Henschel mixer were charged 90 parts of poly(2,6-dimethyl-1,4-phenylene) oxide having an intrinsic viscosity of 0.52 dl/g, as measured in chloroform at 25° C., and having a molecular weight of 16,000, and 10 parts of a modified mesitylene-formaldehyde resin having a softening point of 150° C., a specific gravity of 1.06, and a molecular weight of about 1,300, which was obtained by polycondensing mesitylene and formaldehyde in the presence of sulfuric acid used as catalyst and then modifying the polycondensate with a p-tert-butylphenol. After having been mixed in the Henschel mixer, the mixture was extruded from a twin-screw extruder and pelletized to obtain a molding material. The molding material had the volumetric melt flow rate shown in Table 1. The molding material was injection-molded by means of an injection molding machine (type DM 40, manufactured by Meiki Co., Ltd.) at an injection temperature of 300° C. and an injection pressure of 1,300 kg/cm$^2$ to obtain molded specimens having physical properties as shown in Table 1. In Table 1 are also shown, for comparison, volumetric melt flow rates, and physical properties of the molded specimens obtained from poly(2,6-dimethyl-1,4-phenylene) oxide containing no p-tert-butylphenol-modified mesitylene-formaldehyde resin.

| | Composition of Example 1 | Poly(2,6-dimethyl-1,4-phenylene) oxide alone |
|---|---|---|
| Volumetric melt flow rate,[*1] cc/sec. | $13 \times 10^{-3}$ | $2 \times 10^{-3}$ |
| Tensile strength,[*2] kg/cm$^2$ (ASTM D 638) | 850 | 740 |
| Heat deflection temp.,°C. (ASTM D 648; 1/4″, 264 psi) | 180 | 195 |
| Dielectric constant[*3] (ASTM D 150) | 2.0 (at 60 Hz) 2.0 (at 10 KHz) | 2.0 (at 60 Hz) 2.0 (at 10 KHz) |
| Surface resistivity,[*4] Ω-cm (ASTM D 257) | $10^{17}$ | $10^{17}$ |

Note:
[*1]Measured by Koka-Type Flow Tester (manufactured by Shimadzu Seisakusho Ltd.); 1φ × 2 mm nozzle; 60 kg/cm$^2$ load; 290° C.
[*2]Measured by Autograph IS-5000 (manufactured by Shimadzu Seisakusho Ltd.).
[*3]Measured by a dielectric loss tester (Model TR-10C, manufactured by Ando Electric Co., Ltd.).
[*4]Measured by ULTRA MEGOHMMETER (Model SM-10, manufactured by Toa Electronics Ltd.).

EXAMPLE 2

Molding material and molded specimens were obtained in the same manner as in Example 1, except that an isophthalic acid- and pentaerythritol-modified xylene resin having a softening point of 125° C., a specific gravity of 1.09, and a molecular weight of about 1,300 was used in place of the p-tert-buthyphenol-modified mesitylene-formaldehyde resin. The material and specimens showed the following volumetric melt flow rate and physical properties:

Volumetric melt flow rate, as measured by Koka-Type Flow Tester at 290° C. and 60 kg/cm$^2$: $7.4 \times 10^{-3}$ cc/sec.
Heat deflection temperature: 172° C.
Tensile strength: 875 kg/cm$^2$
Dielectric constant at 10 KHz: 2.00
Surface resistivity: $10^{17}$ Ω-cm

EXAMPLES 3 TO 5

Resin compositions comprising the same poly(2,6-dimethyl-1,4-phenylene) oxide (A) as used in example 1 and the same alkylphenol-modified mesitylene-formaldehyde resin (B) as used in Example 1, in varying ratios were milled by means of a twin-screw extruder to form a uniform mass and injection-molded to obtain molded specimens. The uniform mass and the specimens had the volumetric melt flow rates and the physical properties as shown in Table 2.

TABLE 2

| | Example 3 | Example 4 | Example 5 |
|---|---|---|---|
| Compound ratio (A)/(B) | 70/30 | 50/50 | 35/65 |
| Volumetric melt flow rate, cc/sec | $178 \times 10^{-3}$ (at 290° C., 60 kg/cm$^2$) | $15 \times 10^{-3}$ (at 230° C., 60 kg/cm$^2$) | $300 \times 10^{-3}$ (at 230° C., 60 kg/cm$^2$) |
| Molding conditions Injection molding temperature, °C. | 280 | 260 | 240 |

TABLE 2-continued

| | Example 3 | Example 4 | Example 5 |
|---|---|---|---|
| Injection pressure, kg/cm$^2$ | 1300 | 1000 | 1000 |
| Tensile strength, kg/cm$^2$ | 910 | 870 | 740 |
| Heat deflection temperature, °C. | 153 | 131 | 120 |
| Dielectric constant | 2.0 at 60 Hz | 2.1 at 60 Hz | 2.2 at 60 Hz |
| | 2.0 at 10 KHz | 2.1 at 10 KHz | 2.2 at 10 KHz |
| Surface resistivity, Ω-cm | 10$^{17}$ | 10$^{16}$ | 10$^{16}$ |

EXAMPLE 6

Molding material and molded specimens were prepared in the same manner as in Example 1, except that a 2,3,6-trimethylphenol-2,6-dimethylphenol copolymer (monomer ratio in the charge: 10 mole-% of 2,3,6-trimethylphenol, 90 mole-% of 2,6-dimethylphenol) having an intrinsic viscosity of 0.50 dl/g, as measured in chloroform at 25° C., and a molecular weight of 14,500, was used in place of the poly(2,6-dimethyl-1,4-phenylene) oxide. The molding material showed a volumetric melt flow rate of 12×10$^{-3}$ cc/sec at 290° C. under a load of 60 kg/cm$^2$. The specimens had the following physical properties: tensile strength, 880 kg/cm$^2$; heat deflection temperature, 185° C.; dielectric constant, 2.00 (60 Hz); surface resistivity, 10$^{17}$ Ω-cm.

EXAMPLE 7

A resin composition was prepared by mixing 80 parts by weight of an unmodified xylene-formaldehyde resin having a molecular weight of 380 and an oxygen content of 12% by weight, and 20 parts by weight of poly(2,6-dimethyl-1,4-phenylene) oxide having an intrinsic viscosity of 0.4 dl/g (molecular weight: 11,000), as measured in chloroform at 25° C. In Table 3 are shown physical properties of the above-noted resin composition in comparison with those of the same xylene-formaldehyde resin alone.

TABLE 3

| Item of test | Composition 100% xylene-formaldehyde resin | 80% xylene-formaldehyde resin 20% poly (2,6-dimethyl-1,4-phenylene) oxide |
|---|---|---|
| Specific gravity (20° C.) | 1.059 | 1.059 |
| Dielectric loss tangent (20° C., 1 MHz) | 4.41 × 10$^{-2}$ | 0.5 × 10$^{-2}$ |
| Dielectric constant (1 MHz) | 3.32 | 3.00 |
| Volume resistivity (30° C.), Ω-cm | 6.2 × 10$^{13}$ | 2.0 × 10$^{15}$ |

EXAMPLE 8

A resin composition was prepared by mixing in a Henschel mixer 70 parts of poly(2,6-dimethyl-1,4-phenylene) oxide having an intrinsic viscosity of 0.52 dl/g, as measured in chloroform at 25° C., and a molecular weight of 16,000, 30 parts of the same alkylphenol-modified mesitylene-formaldehyde resin as used in Example 1, 7.0 parts of titanium dioxide, 8 parts of triphenyl phosphate, and 0.5 part of an ethylene-α-olefin copolymer having a Melt Index of 0.7 g/min at 230° C., a reduced viscosity of 2.4 l/g as measured in decahydronaphthalene at 135° C. and a glass-transition temperature of −49° C. (TAFMER P-0880, Trademark of Mitsui Petrochemical Industries Co.) as a releasing agent. After having been mixed, the resin composition was pelletized by means of a twin-screw extruder to obtain a molding material having a volumetric melt flow rate of 8×10$^{-3}$ cc/sec, at 230° C. under a load of 60 kg/cm$^2$. The molding material was injection-molded at an injection pressure of 1,320 kg/cm$^2$, a cylinder temperature of 260° to 280° C., and a mold temperature of 90° C. The resulting molded specimens had the following physical properties: tensile strength, 700 kg/cm$^2$; dielectric constant, 2.3 at 60 Hz; surface resistivity, 10$^{17}$ Ω-cm; heat deflection temperature, 123° C.

EXAMPLE 9

A mixture was prepared from a styrene-butadiene-styrene block copolymer (viscosity of 20% by weight toluene solution thereof is 1,500 cps as measured at 25° C. by a Brookfield Model RVT viscometer) Kraton TR-1101, Trademark of Shell Chemical Co.) used as a rubbery polymer and the same p-tert-butylphenol-modified mesitylene-formaldehyde resin as used in Example 1, in a weight ratio of 2:1. By using a twin-screw extruder, the above mixture was melt-mixed and extruded at 210° C. to yield a uniform resin composition (I). A poly(2,6-dimethyl-1,4-phenylene) oxide having an intrinsic viscosity of 0.52 dl/g, as measured in chloroform at 25° C., the same p-tert-butylphenol-modified mesitylene-formaldehyde resin as used in Example 1, and the above-noted resin composition (I) were mixed in a weight ratio of 70:13.5:16.5. To the resulting mixture were added 1.5 parts of a stabilizer, 7.0 parts of titanium dioxide, 8 parts of triphenyl phosphate, and 0.5 part of an ethylene-α-olefin copolymer (TAFMER P-0880, Trademark of Mitsui Petrochemical Industries Co.). The resulting mixture was mixed in a Henschel mixer and then pelletized by means of a twin-screw extruder to obtain a molding material.

The molding material showed a volumetric melt flow rate of 5×10$^{-3}$ cc/sec, as measured with Koka-Type Flow Tester at 230° C. under a load of 60 kg/cm$^2$. By using an injection machine (type SJ-35B manufactured by Meiki Co.), the said molding material was injection-molded at an injection pressure of 1,320 kg/cm$^2$, a cylinder temperature of 260° to 280° C., and a mold temperature of 90° C. to obtain molded specimens which had favorable appearance and the following characteristics: tensile strength, 620 kg/cm$^2$; elongation, 35%; notched Izod impact strength, 27 kg-cm/cm; tensile impact strength, 200 kg-cm/cm$^2$; heat deflection temperature, 122° C. The specimen, moreover, showed flame retardancy corresponding to Class V-1 according to the flammability test of UL 94.

COMPARATIVE EXAMPLE 1

A commercial molding material of polyphenylene oxide modified with high-impact polystyrene (Noryl SE-1, Trademark of General Electric Co.) was injection-molded to obtain molded specimens which had the following physical properties: tensile strength, 630 kg/cm$^2$; elongation, 21%; notched Izod impact strength, 11 kg-cm/cm; tensile-impact strength, 125 kg-cm/cm$^2$; heat deflection temperature, 120° C.

EXAMPLE 10

Molded specimens having the physical properties given below were obtained in the same manner as in Example 9, except that a styrene-isoprene-styrene block copolymer (viscosity of 20% by weight toluene solution thereof is 1,650 cps as measured at 25° C. by a Brookfield Model RVT viscometer) (Kraton TR-1107, Trademark of Shell Chemical Co.) was used in place of the styrene-butadiene-styrene block copolymer.

Volumetric melt flow rate, as measured with Koka-Type Flow Tester at 230° C. under a load of 60 kg/cm$^2$: 6×10$^{-3}$ cc/sec
Tensile strength: 610 kg/cm$^2$
Elongation: 35%
Notched Izod impact strength: 31 kg-cm/cm
Tensile-impact strength: 200 kg-cm/cm$^2$
Heat deflection temperature: 121° C.

EXAMPLE 11

A blend high-styrene rubber comprising polybutadiene having a Mooney viscosity, ML 1+4 (100° C.), of 50 and polystyrene having a molecular weight of 70,000 in a weight ratio of 40:60 (Milliopol MS-1, Trademark of Hodogaya Chemical Co.) and the same alkylphenol-modified mesitylene-formaldehyde resin as used in Example 1 were mixed in a weight ratio of 1:1 and the mixture was melt-mixed by means of a twin-screw extruder to obtain a uniform resin composition (I). By using a Henschel mixer, a mixture was prepared from 65 parts of a poly(2,6-dimethyl-1,4-phenylene) oxide having an intrinsic viscosity of 0.50 dl/g, as measured in chloroform at 25° C., and a molecular weight of 14,500, 35 parts of the above-noted resin composition (I), 5 parts of triphenyl phosphate, 7 parts of titanium dioxide, and 0.5 part of an ethylene-α-olefin copolymer (TAFMER P-0880). The resulting mixture was pelletized by means of a twin-screw extruder to obtain a molding material. The molding material showed the following volumetric flow rate. And then molded specimens having the following physical properties were obtained by injection molding:

Volumetric melt flow rate, as measured with Koka-Type Flow Tester at 230° C. under a load of 60 kg/cm$^2$: 12×10$^{-3}$ cc/sec
Tensile strength: 600 kg/cm$^2$
Elongation: 35%
Notched Izod impact strength: 30 kg-cm/cm
Tensile-impact strength: 170 kg-cm/cm$^2$
Heat deflection temperature: 121° C.

EXAMPLE 12

Molded specimens having the physical properties given below were obtained in the same manner as in Example 11, except that a styrene-butadiene (60:40) randam copolymer having a Mooney viscosity ML 5+4 (100° C.) of 50 (Hycar 2057S, Trademark of Nippon Zeon Co., Ltd.) was used in place of the blend high-styrene rubber.

Volumetric melt flow rate, as measured with Koka-Type Flow Tester at 230° C. under a load of 60 kg/cm$^2$: 10×10$^{-3}$ cc/sec
Tensile strength: 615 kg/cm$^2$
Elongation: 33%
Notched Izod impact strength: 23 kg-cm/cm
Tensile-impact strength: 180 kg-cm/cm$^2$
Heat deflection temperature: 123° C.

EXAMPLE 13

By using a mixing roll, a methyl methacrylate-butadiene-β-hydroxyethyl methacrylate copolymer (molar ratio of methyl methacrylate to butadiene, 4:6; content of β-hydroxyethyl methacrylate, 5% by weight) (Copolex 1021, Trademark of Mitsubishi Gas Chemical Co.) (as a rubbery polymer) and the same isophthalic acid- and pentaerythritol-modified xylene resin as used in Example 2 (as a xylene resin) were mixed in a weight ratio of 1:1 to obtain a uniform resin composition (I) in the form of a sheet, which was cut to small cubes. A mixture comprising 70 parts of a poly(2,6-dimethyl-1,4-phenylene) oxide having an intrinsic viscosity of 0.56 dl/g, as measured in chloroform at 25° C., and a molecular weight of 19,500, 10 parts of the same modified xylene resin, and 20 parts of the above-noted resin composition (I) was melted, mixed, and extruded by means of a twin-screw extruder to obtain a molding material. The molding material showed the following volumetric melt flow rate. And then molded specimens having the following physical properties were obtained by injection-molding the molding material.

Volumetric melt flow rate, as measured with Koka-Type Flow Tester at 290° C. under a load of 60 kg/cm$^2$: 90×10$^{-3}$ cc/sec
Tensile strength: 740 kg/cm$^2$
Elongation: 25%
Notched Izod impact strength: 15 kg-cm/cm
Tensile-impact strength: 160 kg-cm/cm$^2$
Heat deflection temperature: 135° C.

EXAMPLE 14

Molding material having the volumetric melt flow rate given below and molded specimens having the physical properties given below were obtained in the same manner as in Example 9, except that a 2,6-dimethylphenol/2,3,6-trimethylphenol (95/5 in molar ratio) copolymer having an intrinsic viscosity of 0.50 dl/g, as measured in chloroform at 25° C., and a molecular weight of 14,500, was used in place of the poly(2,6-dimethyl-1,4-phenylene) oxide.

Volumetric melt flow rate, as measured with Koka-Type Flow Tester for 230° C. under a load of 60 kg/cm$^2$: 5.5×10$^{-3}$ cc/sec
Tensile strength: 635 kg/cm$^2$
Elongation: 38%
Notched Izod impact strength: 22 kg-cm/cm
Tensile-impact strength: 180 kg-cm/cm$^2$
Heat deflection temperature: 125° C.

EXAMPLES 15 TO 18

By using a twin-screw extruder, the same styrene-butadiene-styrene block copolymer as used in Example 9 (as rubbery polymer) and the same alkylphenol-modified mesitylene-formaldehyde resin as used in Example 1 were mixed in a weight ratio of 2:1 to form a uniform resin composition (I). Various resin compounds were prepared by mixing poly(2,6-dimethyl-1,4-phenylene) oxide, the same p-tert-butylphenol-modified mesitylene-formaldehyde resin as used in Example 1, and the above-noted resin composition (I) in varying ratios as given in Table 4. To each resin compound were added varying amounts of titanium dioxide, triphenyl phosphate, and the same ethylene-α-olefin copolymer as used in Example 9, as shown in Table 4. After having been mixed in a Henschel mixer, each of the resulting mixtures was fed to a twin-screw extruder, by means of which the mixture was melt-mixed, extruded, and pelletized to obtain a molding material. The molding material was molded by use of an injection machine to yield molded specimens. The molding material had the volumetric melt flow rate shown in Table 4. The molded specimens had the physical properties shown in Table 4.

TABLE 4

|  | Example 15 | Example 16 | Example 17 | Example 18 |
|---|---|---|---|---|
| Composition of resin, parts |  |  |  |  |
| Poly(2,6-dimethyl-1,4-phenylene) oxide, $[\eta]$ = 0.52 dl/g at 25° C. in CHCl$_3$ (molecular weight : 16,000) | 85 | 70 | 55 | 40 |
| Alkylphenol-modified mesitylene-formaldehyde resin | 10 | 20 | 32 | 40 |
| Rubbery polymer | 5 | 10 | 13 | 20 |
| Composition of additive, parts |  |  |  |  |
| Triphenyl phosphate | — | 3.0 | 10.0 | 2.0 |
| Titanium dioxide | 5.0 | 5.0 | 7.0 | 3.0 |
| Ethylene-α-olefin copolymer | 0.3 | 0.5 | 0.5 | 0.5 |
| Volumetric melt flow rate, as measured with Koka Type Flow Tester, cc/sec | $12 \times 10^{-3}$ (at 290° C., 60 kg/cm$^2$) | $120 \times 10^{-3}$ (at 290° C., 60 kg/cm$^2$) | $30 \times 10^{-3}$ (at 230° C., 60 kg/cm$^2$) | $60 \times 10^{-2}$ (at 230° C., 60 kg/cm$^2$) |
| Physical properties |  |  |  |  |
| Tensile strength, kg/cm$^2$ | 780 | 610 | 450 | 430 |
| Elongation, % | 60 | 50 | 40 | 30 |
| Notched Izod impact strength, kg-cm/cm | 10 | 24 | 23 | 25 |
| Tensile impact strength, kg-cm/cm$^2$ | 180 | 200 | 130 | 100 |
| Heat deflection temperature, °C. | 167 | 135 | 100 | 100 |

EXAMPLE 19

By using a twin-screw extruder, 25 parts of the same p-tert-butylphenol-modified mesitylene-formaldehyde resin as used in Example 1 and 5 parts of EPDM (ethylene-propylene-ethylidenenorbornene terpolymer) were mixed to form a uniform resin composition (I), and then the resin composition (I) was mixed with 70 parts of the same poly(2,6-dimethyl-1,4-phenylene) oxide as in Example 9, 5.0 parts of titanium dioxide, 3.0 parts of triphenyl phosphate and 0.5 part of the same ethylene-α-olefin (as a releasing agent) as used in Example 9, in a Henschel mixer. The resulting mixture was melt-mixed, extruded, and pelletized to obtain a molding material. The molding material had a volumetric melt flow rate of $100 \times 10^{-3}$ cc/sec at 290° C. under a load of 60 kg/cm$^2$.

Molded specimens having the following physical properties were obtained by injection molding:
Tensile strength: 640 kg/cm$^2$
Elongation: 45%
Notched Izod impact strength: 20 kg-cm/cm
Tensile impact strength: 170 kg-cm/cm$^2$
Heat deflection temperature: 133° C.

EXAMPLE 20

Molding material and molded specimens having the volumetric melt flow rate and the physical properties given below were obtained in the same manner as in Example 19, except that a polyisoprene rubber having a Mooney viscosity ML 1+4 (100° C.) of 95 (Nipol IR 2200, Trademark of Nippon Zeon Co., Ltd.) was used in place of the EPDM:
Volumetric melt flow rate (at 290° C., under a load of 60 kg/cm$^2$): $90 \times 10^{-3}$ cc/sec
Tensile strength: 620 kg/cm$^2$
Elongation: 55%
Notched Izod impact strength: 25 kg-cm/cm
Tensile impact strength: 190 kg-cm/cm$^2$
Heat deflection temperature: 132° C.

EXAMPLE 21

By using a twin-screw extruder, 10 parts of the same styrene-butadiene-styrene block copolymer as used in Example 9 and 20 parts of phenol-modified xylene-formaldehyde resin having a molecular weight of 1200 were mixed to form a resin composition (I). The resin composition (I) was mixed with 70 parts of the same poly(2,6-dimethyl-1,4-phenylene) oxide as in Example 9, and 3.0 parts of triphenyl phosphate, 5.0 parts of titanium oxide and 0.5 part of the same ethylene-α-olefine copolymer (as a releasing agent) as used in Example 9, in a Henschel mixer. The resulting mixture was melt-mixed and extruded by means of a twin-screw extruder to obtain a molding material. The thus obtained molding material showed a volumetric melt flow rate of $110 \times 10^{-3}$ cc/sec at 290° C. under a load of 60 kg/cm$^2$, and the molded specimens having the following physical properties was obtained by injection molding.
Tensile strength: 630 kg/cm$^2$
Elongation: 40%
Notched Izod impact strength: 18 kg-cm/cm
Tensile impact strength: 150 kg-cm/cm$^2$
Heat deflection temperature: 137° C.

EXAMPLE 22

A molding material was obtained in the same manner as in Example 21, except that p-nonylphenol-modified xylene-formaldehyde resin having a molecular weight of 1300 was used in place of the phenol-modified xylene-formaldehyde resin in Example 21. The resulting molding material showed a volumetric melt flow rate of $130 \times 10^{-3}$ cc/sec at 290° C. under a load of 60 kg/cm$^2$, and molded specimen having the following physical properties was obtained by injection molding,
Tensile strength: 600 kg/cm$^2$
Elongation: 55%
Notched Izod impact strength: 22 kg-cm/cm
Tensile impact strength: 190 kg-cm/cm$^2$
Heat deflection temperature: 133° C.

What is claimed is:

1. A resin composition containing a polyphenylene oxide, comprising
(A) a polyphenylene oxide having the following formula and having a molecular weight of 10,000 or higher:

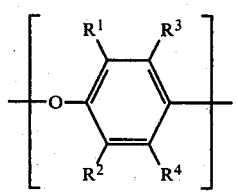

wherein $R_1$ and $R_2$ are lower, straight chain alkyl groups of 1–4 carbon atoms; each of $R_3$ and $R_4$ is a hydrogen atom or has the same meaning as defined above for $R_1$ and $R_2$; the α-carbon atom in each $R_1$, $R_2$, $R_3$ and $R_4$ is not tertiary; n is an integer such that the molecular weight is 10,000 or more; and (B) a thermoplastic modified aromatic hydrocarbon formaldehyde resin, which is obtained by reacting an aromatic hydrocarbon formaldehyde resin having a number average molecular weight of 500 or higher with at least one member selected from the group consisting of phenol, p-tert-butylphenol, p-octylphenol and p-nonylphenol in the presence of an acid catalyst, the weight ratio of said resin (A) to said resin (B) being from 10:90 to 99:1.

2. A resin composition according to claim 1, wherein the weight ratio of the resin (A) to the resin (B) is from 95:5 to 35:65.

3. A resin composition according to claim 1, wherein the resin (A) is poly(2,6-dialkyl-1,4-phenylene)oxide or a copolymer of a 2,6-dialkylphenol and a 2,3,6-trialkylphenol.

4. A resin composition according to claim 1, wherein the resin (A) is poly(2,6-dimethyl-1,4-phenylene)oxide, poly(2-methyl-6-ethyl-1,4-phenylene)oxide, poly(2,6-diethyl-1,4-phenylene)oxide, poly-(2-methyl-6-propyl-1,4-phenylene)oxide, or a copolymer of 2,6-dimethylphenol and 2,3,6-trimethylphenol.

5. A resin composition according to claim 3, wherein the resin (A) is poly(2,6-dimethyl-1,4-phenylene)oxide or a copolymer of 2,6-dimethylphenol and 2,3,6-trimethylphenol.

6. A resin composition according to claim 1, wherein the polyphenylene oxide is prepared by the polycondensation of at least one monocyclic phenol in the presence of oxygen and a catalyst, said monocyclic phenol being represented by the general formula,

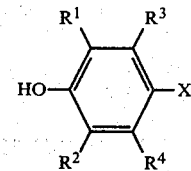

wherein $R_1$ and $R_2$ are lower, straight chain alkyl groups of 1–4 carbon atoms; each of $R_3$ and $R_4$ is a hydrogen atom or has the same meaning as defined above for $R_1$ and $R_2$; the α-carbon atom in each $R_1$, $R_2$, $R_3$ and $R_4$ is not tertiary, and X is a halogen atom or a hydrogen atom.

7. A resin composition according to claim 1 wherein the acid catalyst is sulfuric acid, hydrochloric acid, phosphoric acid, oxalic acid, p-toluenesulfonic acid, m-xylenesulfonic acid or a Lewis acid.

* * * * *